United States Patent
DeWald et al.

(10) Patent No.: US 6,196,349 B1
(45) Date of Patent: Mar. 6, 2001

(54) STEERING CYLINDER TO AXLE HOUSING RETENTION SYSTEM

(75) Inventors: Gregory T. DeWald, Mooresville; Kevin J. Hall, Charlotte, both of NC (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/343,251

(22) Filed: Jun. 30, 1999

(51) Int. Cl.$^7$ ................................................. B62D 5/12
(52) U.S. Cl. ................................. 180/400; 180/439
(58) Field of Search ................ 248/316.1; 180/400, 180/417, 439, 433

(56) References Cited

U.S. PATENT DOCUMENTS

| | | |
|---|---|---|
| 502,686 | 8/1893 | Tilton . |
| 2,509,081 | 5/1950 | Bluth et al. . |
| 2,813,732 | 11/1957 | Hird . |
| 3,326,580 | 6/1967 | Munier et al. . |
| 3,750,489 | 8/1973 | Caldwell . |
| 3,822,953 | 7/1974 | Adelizzi . |
| 4,139,335 | * 2/1979 | Wusthof et al. ................. 418/61 B |
| 4,475,615 | * 10/1984 | Stanek ................................ 180/160 |
| 4,710,141 | * 12/1987 | Ferguson ............................. 440/61 |
| 5,046,870 | 9/1991 | Ordo . |
| 5,094,312 | * 3/1992 | Hakel .................................. 180/132 |
| 5,342,154 | 8/1994 | Holzer . |
| 5,643,022 | * 7/1997 | Wagner ................................ 440/61 |

FOREIGN PATENT DOCUMENTS 8-310429 * 11/1996 (JP) .

* cited by examiner

Primary Examiner—Paul N. Dickson
Assistant Examiner—Avraham H. Lerner
(74) Attorney, Agent, or Firm—Liniak, Berenato, Longacre & White

(57) ABSTRACT

A steering cylinder retention system is provided that replaces the conventional bolted joint with a pin and snap ring arrangement that requires fewer parts and is easier to assemble. The retention system provides a pair of annular axle brackets whereby the steer cylinder is received in both axle brackets. The steer cylinder is retained in the axle brackets by a shoulder, pin and snap ring assembly. More specifically, the steer cylinder is formed with a seating shoulder that abuts one of the axle brackets, and a slot is provided between the cylinder and axle bracket to prevent rotational movement of the cylinder with respect to the axle bracket. A snap ring arrangement fastens the cylinder against axial movement with respect to the axle cylinder.

10 Claims, 5 Drawing Sheets

US 6,196,349 B1

STEERING CYLINDER TO AXLE HOUSING RETENTION SYSTEM

BACKGROUND OF THE INVENTION a) Field of the Invention

This invention relates to a steering cylinder mounting system for mounting a steering cylinder to an axle housing of an automobile. In particular, the present invention replaces the conventional bolted joint for securing a steer cylinder to an axle housing with a system that employs a pin and snap ring to prevent axial and rotational movement of the steer cylinder.

b) Description of Related Art

It is well known to provide a steering cylinder to assist the driver in steering a vehicle. Such power steering systems normally use an engine driven pump and hydraulic system to assist steering action. Pressure from an oil pump is used to operate a piston and cylinder assembly. When the control valve routes oil pressure into one end of the piston, the piston slides in its cylinder. Piston movement can then be used to help move the steering system components.

Conventional automotive steering systems employ a steering cylinder bolted to the axle housing. FIG. 1 illustrates such a conventional bolted joint. As shown in FIG. 1, these conventional steering cylinder arrangements include an axle housing 10 supporting a steering knuckle 14 at each end thereof. The steering cylinder 20 is bolted to the axle housing in the manner shown in FIG. 1, and the cylinder 20 drives the tie rods 22 which in turn assist in turning the steering knuckles 14.

The conventional mounting system of FIG. 1 suffers from a number of drawbacks associated with the manufacture and assembly process. Essentially, the conventional bolted joint requires more hardware, machining of joint parts and requires a relatively long assembly process.

The need therefore exists for a steering cylinder mounting and retention system that overcomes the drawbacks inherent in the prior art, while at the same time providing a reliable system that prevents axial and rotational movement of the steer cylinder.

SUMMARY OF THE INVENTION

The present invention provides a steering cylinder mounting and retention system that eliminates the bolted joint in favor of a retention system pin and snap ring design that substantially reduces the amount of hardware required for the steer cylinder joint, reduces the amount of machined part and reduces the assembly time of the steer cylinder joint.

The present invention provides a pair of annular axle brackets whereby the steer cylinder is received in both axle brackets. The steer cylinder is retained in the axle brackets by a shoulder, pin or ball, and snap ring assembly. More specifically, the steer cylinder is formed with a seating shoulder that abuts one of the axle brackets, and a slot is provided between the cylinder and axle bracket to prevent rotational movement of the cylinder with respect to the axle bracket. A snap ring arrangement fastens the cylinder against axial movement with respect to the axle cylinder.

The specific arrangement and design of the pin and snap ring will depend on the size and capacity of the steer cylinder and axle housing. For example, at rated cylinder pressure for a currently available commercial vehicle, the cylinder reaction force with the axle housing bracket is about 4000 lbs. and that force can act in either direction along the axis of the cylinder. The pin and snap ring design present in this invention will effectively prevent axial and rotational movement of the steer cylinder during use.

These and other benefits of the present invention will become apparent with reference to the appended drawings.

DETAILED DESCRIPTION OF THE PREFERRED

Figure 1:
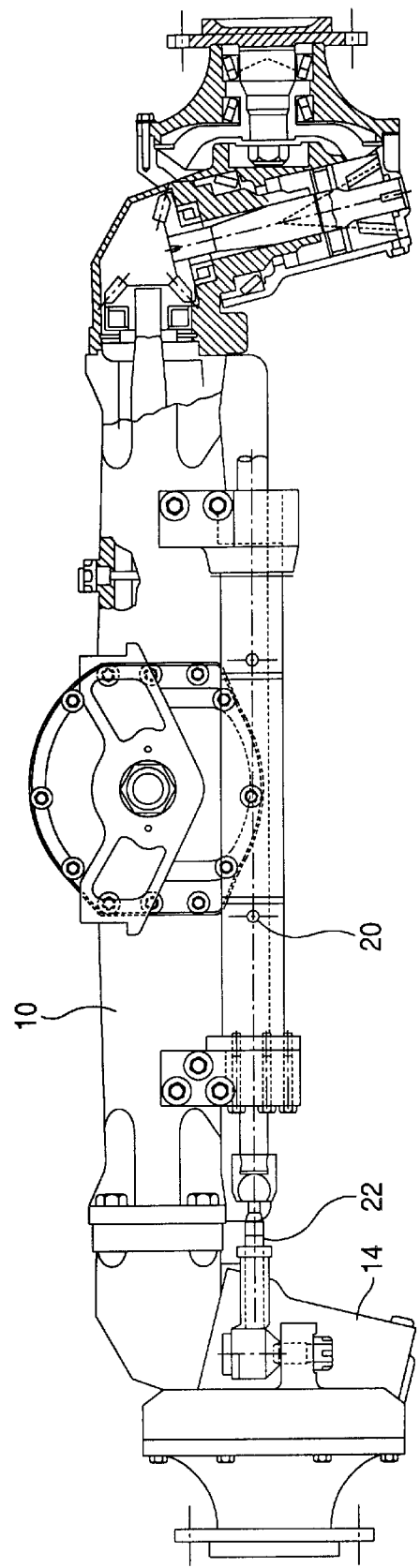
FIG. 1 is a perspective view of the conventional bolted joint for a steering cylinder mounted to an axle housing.

With reference to FIGS. 2–8, the present invention eliminates the conventional bolted joint of FIG. 1 with a retention system that prevent axial and rotational movement of the steer cylinder. The retention system of this invention uses a snap ring to prevent axial movement and a pin member to prevent rotational movement of the steering cylinder.

Figure 2:
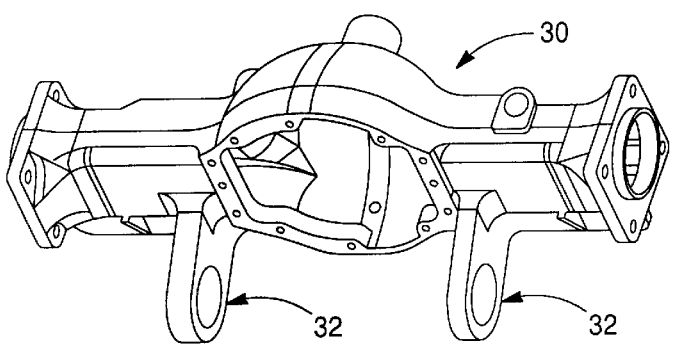
FIG. 2 is a perspective view of an axle housing that incorporates the axle bracket of this invention.

As shown in FIG. 2, the axle housing 30 is manufactured with a pair of axle brackets 32 that are generally annular in shape whereby the inner diameter 'd' of the annular ring is formed to receive a steering cylinder therein. The pair of axle brackets 32 are preferably disposed on opposite sides of the differential assembly for balance and symmetry.

Figure 4:
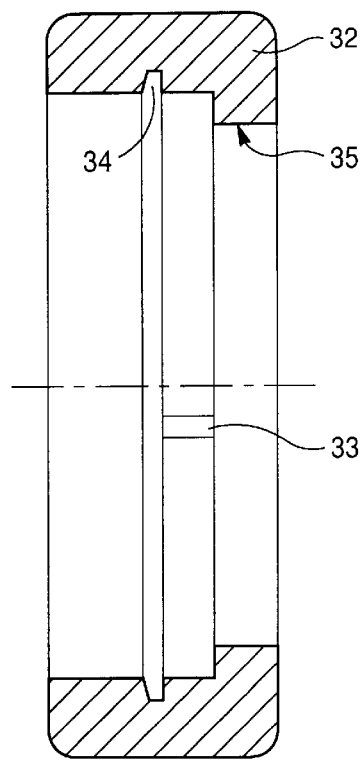
FIG. 4 is a cross sectional view of the axle bracket taken along section line IV—IV of FIG. 3.
Figure 3:
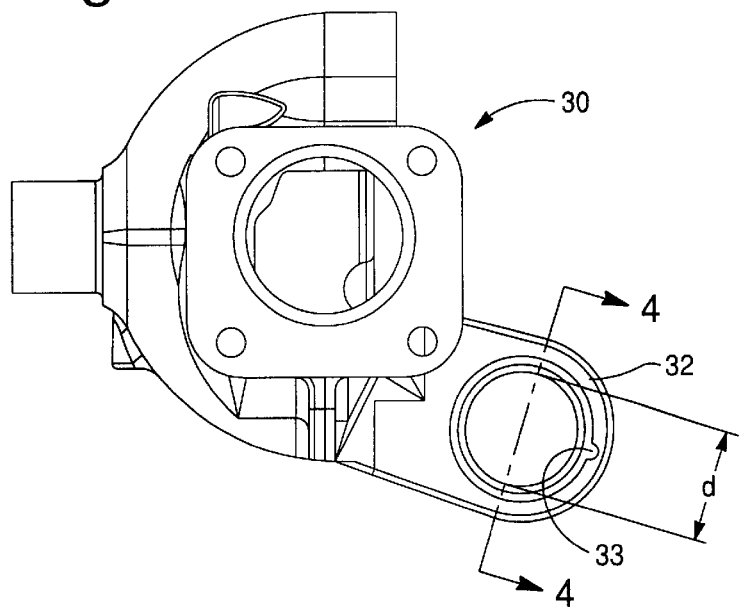
FIG. 3 is a side view of the axle housing and axle bracket of this invention.

With reference to FIG. 3, the axle bracket(s) 32 project from the axle housing and the bracket(s) are formed with an annular opening sized to receive a steering cylinder. As shown in FIG. 3, the annular ring portion of the axle bracket 32 is formed with a notch or slot 33 at its inner peripheral surface. FIG. 4 shows the axle bracket 32 is cross section. The axle bracket 32 is formed with both a beveled circumferential slot 34 and a bracket shoulder 35. The circumferential slot 34 and bracket shoulder 35 will be described in further detail below.

Figure 5:
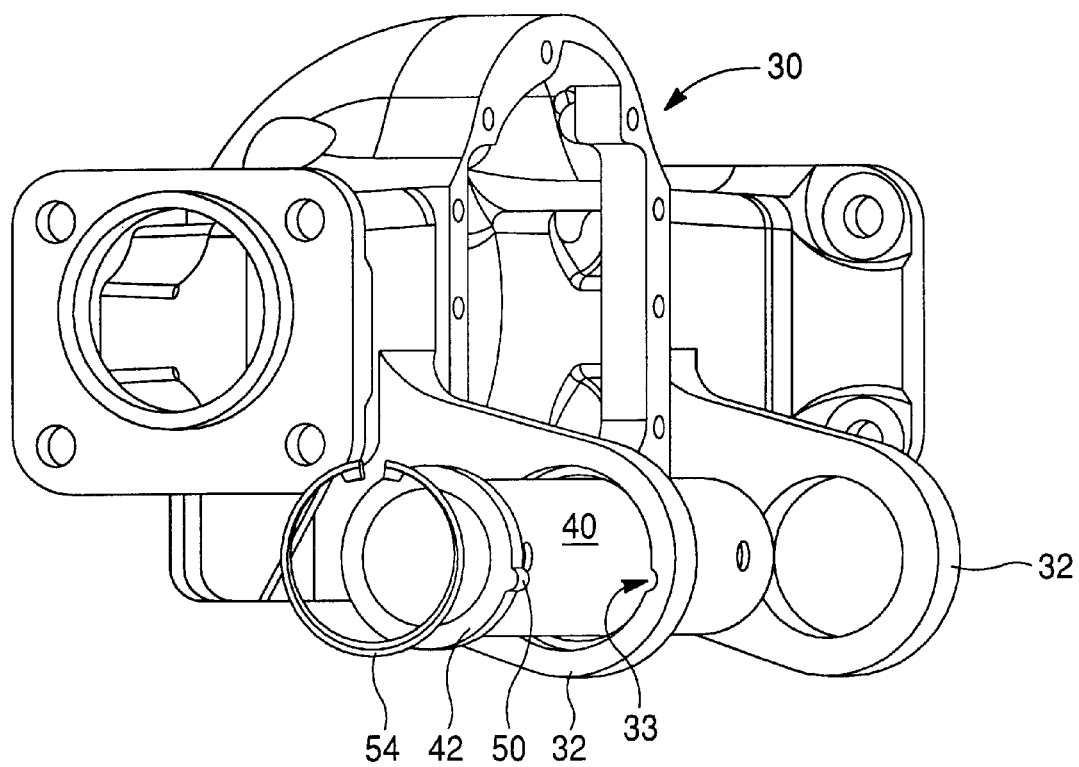
FIG. 5 is a partial exploded, perspective view of one embodiment of the steering cylinder retention system of the present invention wherein the steering cylinder is shown being inserted into the axle brackets and an anti-rotation dowel pin, ball and snap ring retain the cylinder against axial and rotational movement.

FIG. 5 provides a partial exploded, perspective view of one embodiment of the steering cylinder retention system of the present invention wherein the steering cylinder 40 is shown being inserted into the axle brackets 32 and an anti-rotation dowel pin 50 and snap ring 54 retain the cylinder 40 against axial and rotational movement.

As shown in FIG. 5, the steering cylinder 40 is provided with a full shoulder 42 at one end, and that full shoulder 42 retains the dowel pin 50. When the cylinder 40 is inserted through the axle brackets 32 in the manner shown in FIG. 5, the dowel pin 50 is fittingly received in the notch or slot 33 to prevent rotational movement of the cylinder 40 with respect to the axle housing 30. Once the full shoulder 42 of the cylinder 40 comes to rest against the bracket shoulder 35, the snap ring 54 is fitted into the circumferential slot 34 to thereby retain the cylinder against axial movement.

Figure 6:
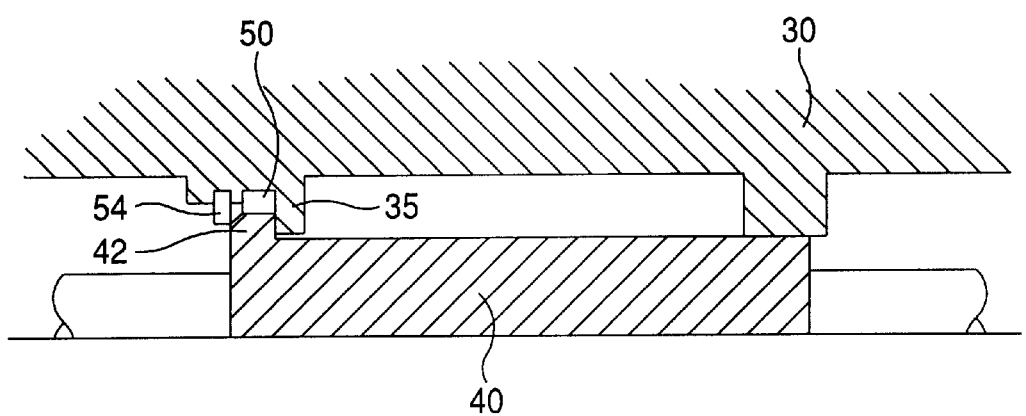
FIG. 6 is a partial cross-sectional view of the axle brackets, steer cylinder, dowel pin and snap ring of the embodiment of FIG. 6.
Figure 7:
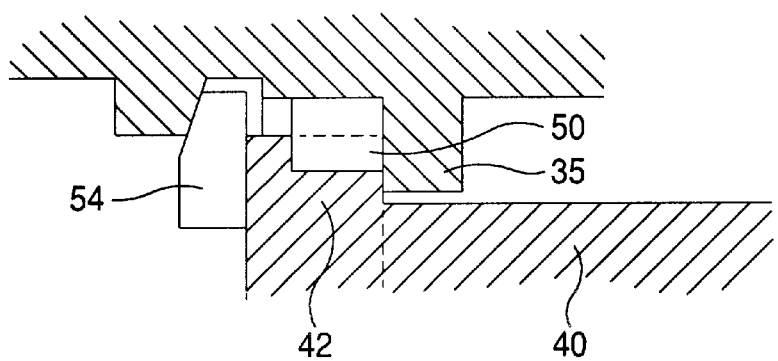
FIG. 7 is an enlarged view of the elements of FIG. 6.

FIGS. 6 and 7 illustrate the interaction of the cylinder 40, axle bracket 32, dowel pin 50 and snap ring 54. As shown, the full shoulder 42 of the cylinder 40 abuts the bracket shoulder 35. The dowel pin 50 is disposed within the notch or slot 33, and it is interposed between the axle bracket 32 and the cylinder shoulder 42. To prevent the cylinder 40 from moving in the axial direction, the snap ring 54 is fitted into the circumferential groove 34 formed within the interior surface of the axle bracket 32.

It will be understood by those of skill in the art that the particular design and arrangement of the circumferential groove 34 and the notch 33 may be varied without departing from the spirit and scope of this invention. Moreover, the groove 34 and notch 33 may be disposed on the other axle bracket 32 shown in the drawing figures.

Figure 8:
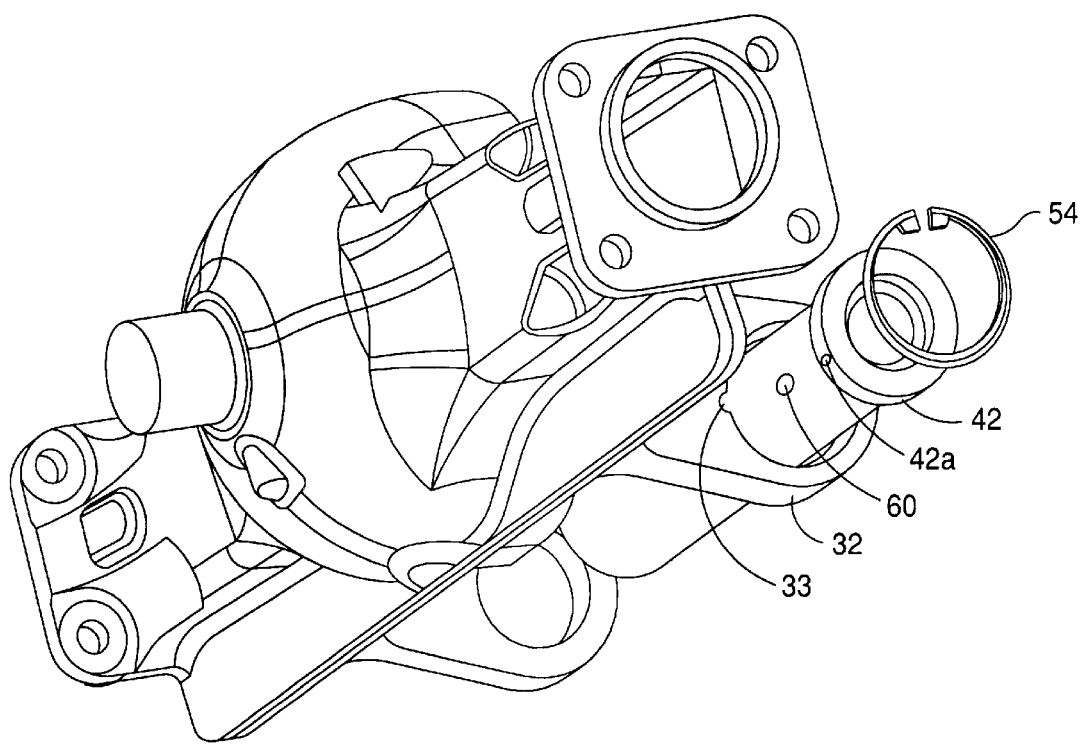
FIG. 8 is a partial exploded, perspective view of another embodiment of the steering cylinder retention system of the present invention wherein the steering cylinder is shown being inserted into the axle brackets and a ball bearing pin and snap ring retain the cylinder against axial and rotational movement.
Figure 9:
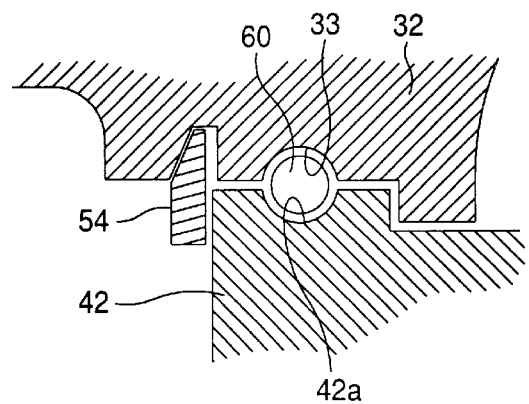
FIG. 9 is a cross sectional view of the embodiment of FIG. 8.

FIGS. 8 and 9 show another embodiment of this invention wherein the dowel pin 50 is replaced with a ball bearing pin 60. The shoulder 42 of the cylinder is formed with blind hole 42a that holds the ball bearing pin 60 relative to the cylinder 40. A round slot or notch 33a is correspondingly bored into the cylinder seating shoulder of the axle bracket 32. As with the previous embodiment, the design of FIGS. 8 and 9 prevents both axial and rotational movement of the cylinder 40 relative to the axle housing 30. More importantly, the invention eliminates the bolted joint required by the prior art.

Essentially, the conventional bolted joint requires a large volume of hardware, a difficult and large amount of machining of joint parts, and requires a relatively long assembly process. The present invention overcomes the drawbacks inherent in the prior art, while at the same time providing a reliable system that prevents axial and rotational movement of the steer cylinder by providing a unique joint that is easy to assemble and requires fewer parts than the conventional bolted joint.

What is claimed is:

1. A steering cylinder retention system for mounting a steering cylinder in a fixed position relative to an axle housing, said steering cylinder retention system comprising:

a steering cylinder for assisting a steering function of a vehicle;

at least one mounting bracket for receiving said steering cylinder in a fixed relation;

a first fastening member for preventing axial displacement of said steering cylinder with respect to said mounting bracket, wherein said first fastening member provides a snap-fit engagement with at least one of said steering cylinder and said mounting bracket.

2. The steering cylinder retention system of claim 1, further comprising a second fastening member for preventing a rotational displacement of said steering cylinder with respect to said mounting bracket.

3. The steering cylinder retention system of claim 1, wherein said first fastening member comprises a snap ring fitted into a circumferential groove formed on said mounting bracket.

4. The steering cylinder retention system of claim 3, wherein said snap ring abuts said steering cylinder.

5. The steering cylinder retention system of claim 2, wherein said second fastening member comprises a projection disposed on one of said steering cylinder and said mounting bracket.

6. The steering cylinder retention system of claim 5, wherein said projection comprises a dowel pin fitted into a slot formed on said steering cylinder.

7. The steering cylinder retention system of claim 5, wherein said projection comprises a ball bearing pin fitted into a recess formed on said steering cylinder.

8. The steering cylinder retention system of claim 1, wherein said steering cylinder is formed with a cylinder shoulder that abuts a bracket shoulder formed on an inner peripheral surface of said mounting bracket, wherein said first fastening member is locked onto said inner peripheral surface opposite said bracket shoulder with respect to said cylinder shoulder.

9. The steering cylinder retention system of claim 1, said at least one mounting bracket comprises a pair of offset annular bracket rings adapted to circumscribe said steering cylinder.

10. The steering cylinder retention system of claim 2, wherein both said first fastening member and said second fastening member securely engage a single mounting bracket.

* * * * *